(12) United States Patent
Yoon et al.

(10) Patent No.: US 12,381,224 B2
(45) Date of Patent: Aug. 5, 2025

(54) NEGATIVE ELECTRODE FOR LITHIUM SECONDARY BATTERY AND METHOD FOR MANUFACTURING SAME

(71) Applicant: LG Energy Solution, Ltd., Seoul (KR)

(72) Inventors: Jong Su Yoon, Daejeon (KR); Taek Soo Lee, Daejeon (KR); Jin Ho Cho, Daejeon (KR); Shin Wook Jeon, Daejeon (KR); Young Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/868,233

(22) PCT Filed: Dec. 20, 2023

(86) PCT No.: PCT/KR2023/021062
§ 371 (c)(1),
(2) Date: Nov. 22, 2024

(87) PCT Pub. No.: WO2024/136432
PCT Pub. Date: Jun. 27, 2024

(65) Prior Publication Data
US 2025/0174660 A1     May 29, 2025

(30) Foreign Application Priority Data

Dec. 23, 2022 (KR) .................. 10-2022-0182981
Feb. 9, 2023 (KR) .................. 10-2023-0017346

(51) Int. Cl.
*H01M 4/587* (2010.01)
*H01M 4/04* (2006.01)
*H01M 4/02* (2006.01)

(52) U.S. Cl.
CPC ......... *H01M 4/587* (2013.01); *H01M 4/0404* (2013.01); *H01M 4/0435* (2013.01); *H01M 2004/021* (2013.01); *H01M 2004/027* (2013.01)

(58) Field of Classification Search
CPC ............... H01M 4/587; H01M 4/0404; H01M 4/0435; H01M 2004/021; H01M 2004/027
See application file for complete search history.

(56) References Cited

U.S. PATENT DOCUMENTS 11,088,361 B2   8/2021   Kang et al.
2014/0065478 A1   3/2014   Mitsuhashi et al.
(Continued)

FOREIGN PATENT DOCUMENTS

CN    108807959 A    11/2018
CN    113066954 A    7/2021
(Continued)

OTHER PUBLICATIONS

International Search Report for PCT/KR2023/021062 mailed Apr. 1, 2024. 3 pages.
Search Report dated Apr. 8, 2025 from the Office Action for Chinese Application No. 202380042686.8 issued Apr. 18, 25, pp. 1-3.

*Primary Examiner* — Cynthia K Walls
(74) *Attorney, Agent, or Firm* — Lerner David LLP

(57) ABSTRACT

A negative electrode for a lithium secondary battery includes a negative electrode active layer and a negative electrode current collector. The negative electrode active layer includes a center region, an edge region, and a sliding region on the current collector, and has the advantage of exhibiting a high-rate charge and discharge and a high energy density with a small volume change during charge and discharge by having an alignment degree (O.I.) of each carbon-based negative electrode active material contained in the center region, the edge region, and the sliding region satisfying (Continued)

Formula 1 and Formula 2. A method of manufacturing the same is also provided.

10 Claims, 1 Drawing Sheet

(56) References Cited

U.S. PATENT DOCUMENTS

| | | |
|---|---|---|
| 2018/0151867 A1 | 5/2018 | Lim et al. |
| 2021/0167398 A1 | 6/2021 | Choi et al. |
| 2021/0336244 A1 | 10/2021 | Kang et al. |
| 2022/0123366 A1 | 4/2022 | Jiang et al. |
| 2022/0320482 A1 | 10/2022 | Miyauchi et al. |
| 2022/0367881 A1 | 11/2022 | Komura |
| 2023/0327215 A1 | 10/2023 | Wu et al. |

FOREIGN PATENT DOCUMENTS

| | | |
|---|---|---|
| CN | 113228341 A | 8/2021 |
| CN | 113950756 A | 1/2022 |
| CN | 115699355 A | 2/2023 |
| JP | 2001015146 A | 1/2001 |
| JP | 2013069431 A | 4/2013 |
| JP | 2013069432 A | 4/2013 |
| JP | 2013069579 A | 4/2013 |
| JP | 2022175371 A | 11/2022 |
| JP | 2022545896 A | 11/2022 |
| KR | 20170043240 A | 4/2017 |
| KR | 20180060778 A | 6/2018 |
| KR | 101972235 B1 | 8/2019 |
| KR | 20200019005 A | 2/2020 |
| KR | 20210115461 A | 9/2021 |
| KR | 20220064389 A | 5/2022 |
| KR | 20220099681 A | 7/2022 |

【FIG. 1】
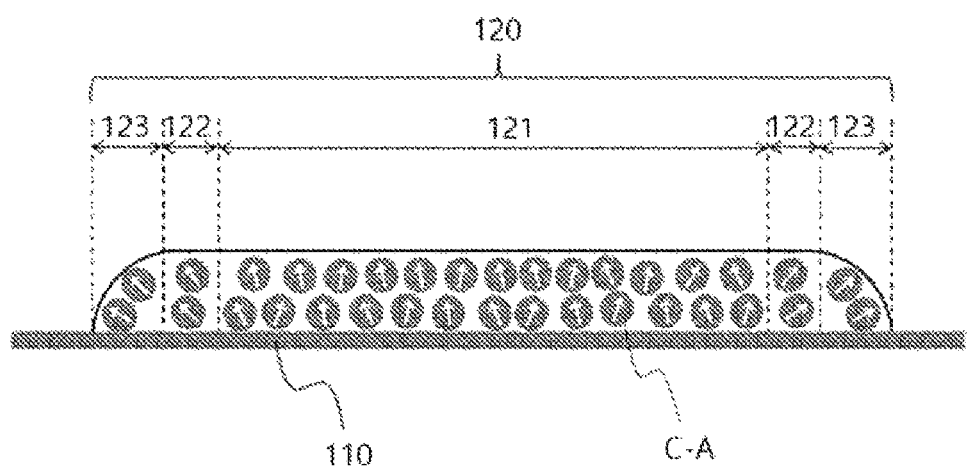
【FIG. 2】
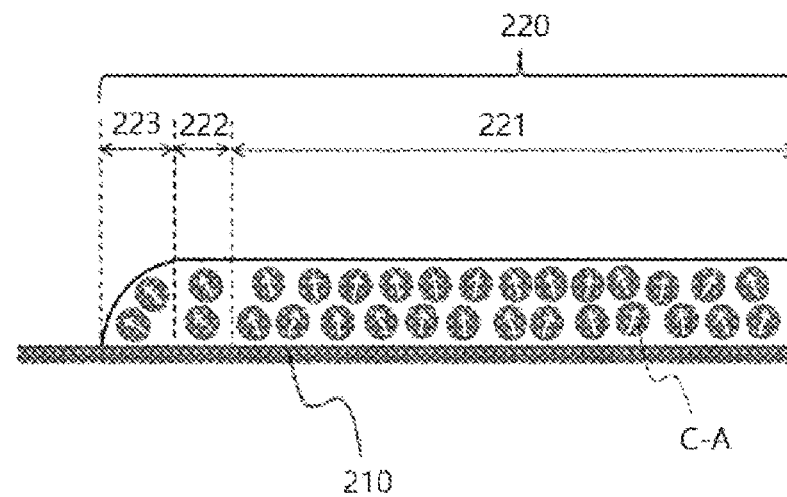

NEGATIVE ELECTRODE FOR LITHIUM SECONDARY BATTERY AND METHOD FOR MANUFACTURING SAME

CROSS-REFERENCE TO RELATED APPLICATION(S)

The present application is a national phase entry under 35 U.S.C. § 371 of International Application No. PCT/KR2023/021062, filed on Dec. 20, 2023, which claims priority from Korean Patent Application No. 10-2022-0182981, filed on Dec. 23, 2022, and Korean Patent Application No. 10-2023-0017346, filed on Feb. 9, 2023, all of which are incorporated herein by reference.

TECHNICAL FIELD

An aspect of the disclosure relates to a negative electrode for lithium secondary battery and manufacturing method thereof.

BACKGROUND ART

Recently, secondary batteries have been widely applied not only in small devices such as portable electronics, but also in medium and large devices such as battery packs or power storage in hybrid or electric vehicles.

Such a secondary battery is a power generating device capable of charging and discharging consisting of a stacked structure of a positive electrode/separator/negative electrode, and generally has a configuration in which the positive electrode includes a lithium metal oxide as a positive electrode active material, and the negative electrode includes a carbon-based negative electrode active material such as graphite, such that lithium ions emitted from the positive electrode are adsorbed into the carbon-based negative electrode active material of the negative electrode when charging, and lithium ions contained in the carbon-based negative electrode active material are adsorbed into the lithium metal oxide of the positive electrode when discharging, and charge and discharge are repeated.

Meanwhile, amorphous carbon or crystalline carbon is used as an active material for negative electrodes, and among them, crystalline carbon is mainly used due to its high capacity. These crystalline carbons include natural graphite and artificial graphite.

Artificial graphite has a higher charge-to-discharge efficiency than natural graphite and less swelling during charging and discharging, resulting in better lifespan characteristics. However, compared to natural graphite, it has a lower reversible capacity, harder particles, difficulty in rolling when manufacturing electrodes, and poor orientation due to low shape change. In particular, it requires a 3000° C.-graphitization heat treatment, resulting in high manufacturing costs.

Meanwhile, natural graphite has been used as a negative electrode active material because it is cheaper than artificial graphite, has a high reversible capacity, and exhibits similar electrochemical properties. However, because natural graphite has a plate-like shape, it has a large surface area and exposed edges, so when electrolyte penetration or decomposition reactions occur, the edges may be delaminated or destroyed, resulting in large irreversible reactions, and the expansion rate increases, resulting in a decrease in long-term lifespan characteristics.

In addition to these carbon-based negative electrode materials, lithium metal, which has been considered as a negative electrode active material, has a very high energy density, and can realize high capacity, but it has safety problems due to dendritic growth (dendrite) during repeated charge and discharge and short cycle life.

As another negative electrode active material, silicon, tin, or alloys thereof have been the subject of much research in recent years, as it has been realized that they can reversibly adsorb and release large amounts of lithium through compound-forming reactions with lithium. For example, silicon has a theoretical maximum capacity of about 4020 mAh/g (9800 mAh/cc, specific gravity 2.23), which is very large compared to graphite-based materials and is therefore promising as a high-capacity negative electrode material. However, the above negative electrode active materials have the disadvantage that the volume change during charge and discharge is very large, and the high-rate discharge characteristics are not high.

Therefore, it is necessary to improve the performance of negative electrode active materials to exhibit low expansion rate, predetermined capacity, high output characteristics and lifespan characteristics. In this regard, first of all, a negative electrode active material comprising a crystalline carbon-based compound such as graphite coated with an amorphous carbon layer can be considered. However, in this case, the energy density is improved, but the proportion of amorphous carbon-based compounds including in the carbon-based negative electrode active material is low, which is insufficient to achieve high output characteristics, and in the case where a uniform coating layer is not formed, the desired level of lifespan characteristics cannot be obtained due to poor electrical conductivity.

Therefore, various attempts have been made to develop negative electrode active materials with excellent lifespan characteristics by improving high-rate charge and discharge characteristics and low expansion ability. There is a high need for a technology that can simultaneously realize high-rate charge and discharge characteristics and high energy density of negative electrode active materials while fundamentally solving these problems.

SUMMARY

Technical Problem

An aspect of the disclosure is directed to provide a negative electrode for a lithium secondary battery, including a carbon-based negative electrode active material such as natural graphite, which exhibits a small volume change during charge and discharge, while exhibiting a high-rate charge and discharge and a high energy density, and a manufacturing method thereof.

Technical Solution

To solve the problems described above,
An aspect of the disclosure provides,
a negative electrode current collector; and a negative electrode active layer provided on at least one side of the negative electrode current collector and comprising a carbon-based negative electrode active material,
wherein the negative electrode active layer is,
divided in a width direction of the negative electrode active layer into a center region including a center portion, a sliding region located at an edge of the negative electrode active layer and having a thickness gradient, and an edge region located between the center region and the sliding region;

and to provide a negative electrode for a lithium secondary battery satisfying the following Formula 1 and Formula 2:

$$1.6 \leq [O.I_{edge}]/[O.I_{center}] \leq 2.5 \quad \text{[Formula 1]}$$

$$2.6 \leq [O.I_{sliding}]/[O.I_{center}] \leq 3.5 \quad \text{[Formula 2]}$$

(In Formula 1 and Formula 2, $O.I_{edge}$ indicates the degree of alignment (O.I) in the edge region, $O.I_{center}$ indicates the degree of alignment (O.I) at the center region, and $O.I_{sliding}$ indicates the alignment in the sliding region, The degree of alignment (O.I) indicates the ratio ($I_{004}/I_{110}$) of the area ($I_{004}$) of the peak representing the [0,0,4] crystal plane and the area ($I_{110}$) of the peak representing the [1,1,0] crystal plane in the XRD measurement for the negative electrode active layer).

In this case, the center region of the negative electrode active layer may have an alignment degree ($O.I_{center}$) of 0.7 to 1.5.

Further, the center region of the negative electrode active layer may have a ratio of 90% or more of the total length in the width direction of the negative electrode active layer, and the sliding region of the negative electrode active layer may have a ratio of 3% or less of the total length in the width direction of the negative electrode active layer.

Further, the negative electrode active layer may satisfy the following Formula 3:

$$R_{sliding} < R_{edge} \leq R_{center} \quad \text{[Formula 3]}$$

(In Formula 3, $R_{sliding}$ indicates the average thickness of the sliding region, $R_{edge}$ indicates the average thickness of the edge region, and $R_{center}$ indicates the average thickness of the center region).

In addition, the center region of the negative electrode active layer may have an average thickness of 100 μm to 300 μm, and the sliding region of the negative electrode active layer may have an inclination angle of 70° or more of the exposed surface with respect to the current collector.

Meanwhile, the carbon-based negative electrode active material may include one or more of natural graphite and artificial graphite.

An aspect of the disclosure further comprises, applying a negative electrode slurry including a carbon-based negative electrode active material onto a negative current collector;

applying a magnetic field to the applied negative electrode slurry; and including drying the magnetic field applied negative electrode slurry to form a negative electrode active layer, wherein the negative electrode active layer is divided into a center region including a central portion in a width direction of the negative electrode active layer, a sliding region located at an edge of the negative electrode active layer and having a thickness gradient, and an edge region located between the center region and the sliding region; and providing a method for manufacturing a negative electrode for a lithium secondary battery satisfying Formula 1 and Formula 2 below:

$$1.6 \leq [O.I_{edge}]/[O.I_{center}] \leq 2.5 \quad \text{[Formula 1]}$$

$$2.6 \leq [O.I_{sliding}]/[O.I_{center}] \leq 3.5 \quad \text{[Formula 2]}$$

(In Formula 1 and Formula 2, $O.I_{edge}$ indicates the degree of alignment (O.I) in the edge region, $O.I_{center}$ indicates the degree of alignment (O.I) at the center region, and $O.I_{sliding}$ indicates the alignment in the sliding region, The degree of alignment (O.I.) indicates the ratio ($I_{004}/I_{110}$) of the area ($I_{004}$) of the peak representing the [0,0,4] crystal plane and the area ($I_{110}$) of the peak representing the [1,1,0] crystal plane in the XRD measurement for the negative electrode active layer).

Here, the applying a magnetic field may apply magnetic field of 2,000 G to 6,000 G, and the time for applying the magnetic field may be from 5 seconds to 60 seconds.

Further, the applying the magnetic field may be performed by magnet portions introduced into the upper portion and the lower portion of the applied negative electrode slurry, wherein the magnet portions may have a length of 105% to 200% based on a length in a width direction of the negative electrode slurry.

Further, the forming the negative electrode active layer may include drying the negative electrode slurry; and rolling the dried negative electrode slurry.

In this case, the edge region of the negative electrode active layer may have a thickness ratio of 90% or more and less than 105% based on an average thickness of the center region of the negative electrode active layer before rolling.

Advantageous Effects

The negative electrode for a lithium secondary battery according to an aspect of the disclosure includes a negative electrode active layer divided into a center region, an edge region, and a sliding region on a current collector, and has the advantage of exhibiting a high-rate charge and discharge and a high energy density with a small volume change during charge and discharge by having an alignment degree (O.I.) of each carbon-based negative electrode active material contained in the center region, the edge region, and the sliding region satisfying Formula 1 and Formula 2.

BRIEF DESCRIPTION OF THE DRAWINGS

FIGS. 1 and 2 are images illustrating a cross-sectional structure of a negative electrode according to an aspect of the disclosure.

DETAILED DESCRIPTION

The present invention may have various modifications and various embodiments, and thus specific embodiments thereof will be described in detail below.

However, it should be understood that the present invention is not limited to the specific embodiments, and includes all modifications, equivalents, or alternatives within the spirit and technical scope of the present invention.

The terms "comprise," "include," and "have" used herein designate the presence of characteristics, numbers, steps, actions, components, or members described in the specification or a combination thereof, and it should be understood that the possibility of the presence or addition of one or more other characteristics, numbers, steps, actions, components, members, or a combination thereof is not excluded in advance.

In addition, in the present invention, when a part of a layer, film, region, plate, or the like is disposed "on" another part, this includes not only a case in which one part is disposed "directly on" another part, but a case in which still another part is interposed therebetween. In contrast, when a part of a layer, film, region, plate, or the like is disposed "under" another part, this includes not only a case in which one part is disposed "directly under" another part, but a case in which still another part is interposed therebetween. In addition, in the present application, "on" may include not only a case of being disposed on an upper portion but also a case of being disposed on a lower portion.

In addition, as used herein, "including as a major component" may mean including at least 50 wt % (or at least 50 vol %), at least 60 wt % (or at least 60 vol %), at least 70 wt % (or at least 70 vol %), at least 80 wt % (or at least 80 vol %), at least 90 wt % (or at least 90 vol %), or at least 95 wt % (or at least 95 vol %) of a defined component by total weight (or total volume). For example, "comprising graphite as a primary component as a negative electrode active material" may mean including at least 50 wt %, at least 60 wt %, at least 70 wt %, at least 80 wt %, at least 90 wt %, or at least 95 wt % of graphite, based on the total weight of the negative electrode active material, and in some cases may mean that the entire negative electrode active material is graphite, comprising at least 100 wt % of graphite.

In addition, as used herein, "carbon-based negative electrode active material is oriented" or "carbon-based negative electrode active material is aligned" means that the crystal planes of the carbon-based negative electrode active material comprising the negative electrode active material particles are distributed to have a predetermined orientation relative to the surface of the negative electrode current collector, which may differ from the carbon-based negative electrode active material particles themselves being arranged to have a specific orientation within the negative electrode active layer.

Further, "high orientation of the carbon-based negative electrode active material" may mean that the carbon-based negative electrode active material contained in the negative electrode active layer is aligned at a high frequency based on the surface of the negative electrode current collector, and in some cases, the carbon-based negative electrode active material contained in the negative electrode active layer is aligned at a high angle based on the surface of the negative electrode current collector.

Further, "high alignment of the carbon-based negative electrode active material" may mean that the "degree of alignment (O.I.)" referred to herein has a large value, such that the carbon-based negative electrode active material contained in the negative electrode active layer is aligned at a low angle relative to the surface of the negative current collector. Conversely, "low alignment of carbon-based negative electrode active material" may mean that "degree of alignment (O.I.)" has a small value, indicating that the carbon-based negative electrode active material contained in the negative electrode active layer is aligned at a high angle relative to the surface of the negative current collector.

Hereinafter, an aspect of the disclosure will be described in more detail.

Negative Electrode for Lithium Secondary Battery

An aspect of the disclosure provides,
a current collector, including a negative electrode; and a
negative electrode active layer provided on at least one side of the negative electrode current collector and comprising a carbon-based negative electrode active material,
wherein the negative electrode active layer is,
divided in a width direction of the negative electrode active layer into a center region including a center portion, a sliding region located at an edge of the negative electrode active layer and having a thickness gradient, and an edge region located between the center region and the sliding region;

To provide a negative electrode for a lithium secondary battery satisfying the following Formula 1 and Formula 2:

$$1.6 \leq [O.I_{edge}]/[O.I_{center}] \leq 2.5 \quad \text{[Formula 1]}$$

$$2.6 \leq [O.I_{sliding}]/[O.I_{center}] \leq 3.5 \quad \text{[Formula 2]}$$

(In Formula 1 and Formula 2,
$O.I_{edge}$ indicates the degree of alignment (O.I.) in the edge region,
$O.I_{center}$ indicates the degree of alignment (O.I.) at the center region, and
$O.I_{sliding}$ indicates the alignment in the sliding region,
and the degree of alignment (O.I.) indicates the ratio $(I_{004}/I_{110})$ of the area $(I_{004})$ of the peak representing the [0,0,4] crystal plane and the area $(I_{110})$ of the peak representing the [1,1,0] crystal plane in the XRD measurement for the negative electrode active layer).

FIGS. 1 and 2 are cross-sectional views illustrating the structure of negative electrodes 100 and 200 having a negative active layer arranged on one side of the negative current collector according to an aspect of the disclosure.

The negative electrodes 100 and 200 for a lithium secondary battery according to an aspect of the disclosure include negative electrode active layers 120 and 220 comprising a carbon-based negative electrode active material on at least one side of the negative electrode current collectors 110 and 210. The negative electrode active layers 120 and 220 are layers embodying the electrical activity of the negative electrode and are prepared by applying a negative electrode slurry including a negative electrode active material embodying an electrochemical redox reaction during charging and discharging of the battery to at least one surface of the negative current collectors 110 and 210, followed by drying and rolling.

In this case, the negative electrode active layers 120 and 220 are divided into a center region, an edge region, and a sliding region in the width direction of the negative electrodes 100 and 200. Specifically, the negative electrode active layers 120 and 220 include a center region in the width direction, and center regions 121 and 221 having a ratio of at least 90% of the total length in the width direction. The center regions 121 and 221 are regions that comprise the majority of the negative electrode active layers 120 and 220 and may have a ratio of 93% or more; 95% or more; 97% or more; or 96% to 99% of the total length in the width direction of the negative electrode active layers 120 and 220. As used herein, the term "width direction of the negative active layers 120 and 220" may mean a direction perpendicular to the direction in which the current collector is driven in the manufacture of the negative electrode, which in some cases may be the same as the direction in which the negative tabs are driven from one side of the manufactured negative electrode to the opposite side thereof. An aspect of the disclosure may further increase the power output and energy density of the lithium secondary battery of the negative electrode by adjusting the length ratio of the center regions 121 and 221 in the negative electrode active layers 120 and 220 to the above range.

Further, on the outer sides of the center regions 121 and 221, edge regions 122 and 222 are positioned, and on the outer sides of the edge regions 122 and 222, sliding regions 123 and 223 are positioned.

At this time, the edge regions and the sliding regions may be sequentially and continuously disposed on both sides of the center region 121 as shown in FIG. 1, or, in some cases, they may be sequentially and continuously disposed on only one side of the center region 221 as shown in FIG. 2 due to the fact that the blanking (or notching) of the electrode sheet is performed during the negative electrode manufacturing process.

Further, the sliding regions 123 and 223 may be regions having a thickness gradient located at the edges of the negative electrode active layers 120 and 220 and may have a ratio of 3% or less of the total length in the width direction of the negative electrode active layers 120 and 220. Specifically, the sliding regions 123 and 223 may have a shape in which the thickness decreases outwardly in the region adjacent to the edge regions 122 and 222, and may have a ratio of 2% or less; 1% or less; 0.5% or less; 0.01% to 1%; or 0.01% to 0.5% of the total length in the width direction of the negative electrode active layers 120 and 220, taking into account the energy density of the negative electrode. In this case, the above length ratio is the total length ratio arranged based on the width direction of the negative electrode active layers 120 and 220, and when the sliding regions 123 and 223 are arranged on both sides of the center region 121 as shown in FIG. 1, the length ratio of each sliding region may be reduced by one-half of the above ratio.

In addition, the sliding regions 123 and 223 may have a thickness gradient that decreases in thickness as it progresses outwardly, such that the exposed surface may have a predetermined angle of inclination with respect to the negative electrode current collectors 110 and 210. For example, the sliding regions 123 and 223 may have an inclination angle of 70° or more with respect to the negative electrode current collectors 110 and 210 such that the exposed surface has an inclination angle of 75° or more; 80° or more; 85° or more; 70-85°; 75-80°; 70-75°. An aspect of the disclosure can prevent the N/P ratio from being reversed at the end portion of the electrode assembly assembled with the positive electrode by adjusting the inclination angle with respect to the negative electrode current collectors 110 and 210 having the exposed surfaces of the sliding regions 123 and 223 to the above range and can further improve the adhesion with the separator at the negative electrode end portion.

Further, the edge regions 122 and 222 may serve as a buffer region located between the center regions 121 and 221 and the sliding regions 123 and 223 and may occupy a residual length other than the aforementioned ratio of the lengths of the center regions 121 and 221 and the sliding regions 123 and 223. For example, the edge regions 122 and 222 may have a width direction of less than 7%; less than 5%; less than 4%; less than 2.5%; 0.09% to 3%; or 0.5 to 1% of the total length of the negative electrode active layers 120 and 220. The edge regions 122 and 222 may be arranged on either side of the center region 121, as may the sliding regions 123 and 223, such that the length ratio of each edge region may be reduced by one-half of the above length ratio.

The edge regions 122 and 222 may be positioned between the center regions 121 and 221, which have a constant high loading amount and/or thickness, and the sliding regions 123 and 223, which have a variable low loading amount and/or thickness, thereby having a constant high or low loading amount and/or thickness configuration.

In one example, the negative electrode active layers 120 and 220 may satisfy Formula 3 below:

$$R_{sliding} < R_{edge} \leq R_{center}$$ [Formula 3]

(In Formula 3, $R_{sliding}$ indicates the average thickness of the sliding region, $R_{edge}$ indicates the average thickness of the edge region, and $R_{center}$ indicates the average thickness of the center region).

Formula 3 shows a correlation between the average thickness of each region, which means that each region of the negative electrode active layers 120 and 220 according to an aspect of the disclosure has a tendency to decrease in average thickness as the position changes from the center to the periphery of the negative electrode active layers 120 and 220. Here, "average thickness" may be measured using a confocal microscope, and the method of measurement may be different for each region.

Specifically, for the center region and the edge region, it may mean measuring the thickness at three or more random points and calculating an average value from the measured values. In the case of the sliding region, it may mean measuring the thickness of a point at ½ of the length of the sliding region in the width direction.

For example, the center regions 121 and 221 of the negative electrode active layers 120 and 220 may have an average thickness of 140±3 μm, the edge regions 122 and 222 may have an average thickness of 139±3 μm, and the sliding regions 123 and 223 may have an average thickness of 75±3 μm.

As another example, the negative electrode active layers 120 and 220 may be such that the average loading amount per unit area of each region decreases as the position of the negative electrode active layers 120 and 220 changes from the center to the periphery. Here, the average loading amount per unit area of each region is not limited in area as long as it is an average loading amount in the same area.

By having the negative electrode active layers 120 and 220 of an aspect of the disclosure having the average loading amount per unit area and/or average thickness of each region as described above, the high-rate charge and discharge characteristics and energy density of the battery including them can be further improved.

Specifically, the carbon-based negative electrode active material (C-A) contained in the negative electrode active layers 120 and 220 may have a crystal plane oriented to have a predetermined angle with respect to the surface of the negative electrode current collectors 110 and 210, such that the movement of electrons or lithium ions may be changed depending on the degree of orientation and/or the direction of orientation of the negative electrode active material, and the physical-chemical movement of the carbon-based negative electrode active material, such as volume expansion or contraction, may also be changed. In this case, the crystal plane orientation of the carbon-based negative electrode active material may be realized by applying a magnetic field to the negative electrode slurry containing the carbon-based negative electrode active material during the manufacture of the negative electrode, and the degree of orientation and/or the direction of orientation may depend on the state or condition of the negative electrode slurry to form the negative electrode active layers 120 and 220. Accordingly, an aspect of the disclosure may be characterized by controlling the orientation of the carbon-based negative electrode active material in each region comprising the negative electrode active layers 120 and 220 such that as the loading amount and/or thickness of the negative electrode active layers decreases, the angle of the crystal planes of the carbon-based negative electrode active material contained in the negative electrode active layers decreases.

For example, the negative electrode active layers 120 and 220 according to an aspect of the disclosure can be oriented such that the average loading amount per unit area and/or the average thickness decreases in the order of the center region, the edge region, and the sliding region, so that the crystal plane angle of the carbon-based negative electrode active material contained in the negative electrode active layers 120 and 220 with respect to the surface of the negative electrode current collectors 110 and 210 is lowered. In this case, the orientation of the carbon-based negative electrode active material (e.g., graphite) may be determined by crystal plane analysis of the carbon-based negative electrode active material contained in the negative electrode active layer.

In one example, the negative electrode active layers 120 and 220 may satisfy Formula 1 and Formula 2 below:

$1.6 \leq [O.I_{edge}]/[O.I_{center}] \leq 2.5$     [Formula 1]

$2.6 \leq [O.I_{sliding}]/[O.I_{center}] \leq 3.5$     [Formula 2]

(In Formula 1 and Formula 2, $O.I_{edge}$ indicates the degree of alignment (O.I.) in the edge region, $O.I_{center}$ indicates the degree of alignment (O.I.) at the center region, and $O.I_{sliding}$ indicates the alignment in the sliding region, The degree of alignment (O.I.) indicates the ratio ($I_{004}/I_{110}$) of the area ($I_{004}$) of the peak representing the [0,0,4] crystal plane and the area ($I_{110}$) of the peak representing the [1,1,0] crystal plane in the XRD measurement for the negative electrode active layer).

The degree of orientation (O.I.) of the carbon-based negative electrode active material (C-A) may be an indicator of the degree of orientation of the crystal structure of the spherical carbon-based negative electrode active material in a certain direction, more specifically, with respect to the surface of the negative electrode current collector upon X-ray diffraction (XRD) measurement. More specifically, the negative electrode active layer has a crystalline structure that is oriented in an oriented manner in X-ray diffraction measurements with peaks for graphite, a carbon-based negative electrode active material, at $2\theta = 26.5 \pm 0.2°$, $42.4 \pm 0.2°$, $43.4 \pm 0.2°$, $44.6 \pm 0.2°$, $54.7 \pm 0.2°$, and $77.5 \pm 0.2°$, which represent the [0,0,2]face, [1,0,0]face, [1,0,1]R face, [1,0,1]H face, [0,0,4]face, and [1,1,0]face, respectively. Further, the peak appearing at $2\theta = 43.4 \pm 0.2°$ may be viewed as an overlap of the peaks corresponding to the [1,0,1]R face of the carbon-based negative electrode active material (C-A) and the [1,1,1]face of the current collector, such as copper (Cu).

Among them, the alignment degree (O.I.) of the carbon-based negative electrode active material (C-A) can be measured by the ratio of the areas of the peak at $2\theta = 54.7 \pm 0.2°$ representing the [0,0,4]face and the peak at $2\theta = 77.5 \pm 0.2°$ representing the [1,1,0]face, specifically, the ratio of the areas obtained by integrating the intensities of the above peaks. Here, since the peak at $2\theta = 54.7 \pm 0.2°$ is a peak representing the [0,0,4]face having an inclination with the negative electrode current collector among the crystal faces of graphite, the degree of alignment (O.I.) may mean that the inclination with respect to the surface of the negative electrode current collector is close to 90° when the value is close to 0, and the inclination with respect to the surface of the negative electrode current collector is close to 0° or 180° when the value is larger. In other words, the negative electrode active layer according to an aspect of the disclosure is aligned such that the carbon-based negative electrode active material (C-A) has a high angle with respect to the negative electrode current collector, such as an angle of 60° or more, 70° or more, 70-90°, 80-90°, 65-85°, or 70-85° with respect to the negative electrode current collector, so that the degree of alignment (O.I.) of the carbon-based negative electrode active material (C-A) may be low compared to a case where the carbon-based negative electrode active material (C-A) is aligned at a low angle.

Considering this, Formula 1 indicates that the degree of alignment ($O.I_{center}$) of the carbon-based negative electrode active material contained in the center region has a smaller value than the degree of alignment ($O.I_{edge}$) of the carbon-based negative electrode active material contained in the edge region, which means that the carbon-based negative electrode active material in the center region is aligned at a higher angle with respect to the surface of the negative current collector than the carbon-based negative electrode active material in the edge region. An aspect of the disclosure's negative electrode active layers 120 and 220 are such that the carbon-based negative electrode active material in the center region is aligned at a higher angle with respect to the surface of the negative electrode current collector than the carbon-based negative electrode active material in the edge region, such that Equation 1 can be satisfied with a ratio of 1.6 to 2.5 (in other words, $1.6 \leq [O.I_{edge}]/[O.I_{center}] \leq 2.5$), and more specifically, 1.7 to 2.0 (i.e., $1.7 \leq [O.I_{edge}]/[O.I_{center}] \leq 2.0$); 1.8 to 2.2 (i.e., $1.8 \leq [O.I_{edge}]/[O.I_{center}] \leq 2.2$); 2.1 to 2.4 (in other words, $2.1 \leq [O.I_{edge}]/[O.I_{center}] \leq 2.4$); or 1.7 to 2.3 (in other words, $1.7 \leq [O.I_{edge}]/[O.I_{center}] \leq 2.3$).

Further, Formula 2 indicates that the degree of alignment ($O.I_{center}$) of the carbon-based negative electrode active material contained in the center region has a smaller value than the degree of alignment ($O.I_{sliding}$) of the carbon-based negative electrode active material contained in the sliding region, which means that the carbon-based negative electrode active material in the center region is aligned at a higher angle with respect to the surface of the negative current collector than the carbon-based negative electrode active material in the sliding region. An aspect of the disclosure's negative electrode active layers 120 and 220 can satisfy the above formula 2 with a ratio of 2.6 to 3.5 ($2.6 \leq [O.I_{sliding}]/[O.I_{center}] \leq 3.5$) due to the carbon-based negative electrode active material in the center region being aligned at a higher angle with respect to the surface of the negative electrode current collector than the carbon-based negative electrode active material in the sliding region, more specifically, 2.6 to 2.9 ($2.6 \leq [O.I_{sliding}]/[O.I_{center}] \leq 2.9$); 3.0 to 3.5 ($3.0 \leq [O.I_{sliding}]/[O.I_{center}] \leq 3.5$); 2.8 to 3.3 ($2.8 \leq [O.I_{sliding}]/[O.I_{center}] \leq 3.3$); 3.1 to 3.3 ($3.1 \leq [O.I_{sliding}]/[O.I_{center}] \leq 3.3$); or 2.6 to 2.8 ($2.6 \leq [O.I_{sliding}]/[O.I_{center}] \leq 2.8$).

Each region of the negative electrode active layers 120 and 220 may have an alignment degree (O.I.) of the carbon-based negative electrode active material (C-A) satisfying the conditions of Formula 1 and Formula 2 above, such that the average alignment degree of the carbon-based negative electrode active material (C-A) contained in the entire negative electrode active layer (120 and 220) can be kept low.

Specifically, the center regions 121 and 221 of the negative electrode active layers 120 and 220 may have an alignment degree ($O.I_{center}$) of the carbon-based negative electrode active material (C-A) contained in this region of 0.7 to 1.5, more specifically, 0.7 to 1.3; 0.7 to 1.0; 0.9 to 1.2; or 0.8 to 1.1. In this case, the degree of alignment ($O.I_{center}$) of the center regions 121 and 221 may have a deviation of 5% or less from the average degree of alignment of the negative electrode active layers 120 and 220.

An aspect of the disclosure in which the alignment of the carbon-based negative electrode active materials (C-A) contained in the center regions 121 and 221, edge regions 122 and 222, and sliding regions 123 and 223 of the negative electrode active layers 120 and 220, respectively is adjusted as described above, it is advantageous that the volume change of the negative electrode active layers 120 and 220 during charging and discharging on the current collector is small, the movement of electrons and/or lithium ions inside the negative electrode active layers 120 and 220 is easy, and the electrode resistance is low, thereby improving the high-rate charge and discharge characteristics of the battery.

Meanwhile, the average thickness of the negative electrode active layers 120 and 220 may be 100 μm to 300 μm, more specifically, 100 μm to 250 μm; or 130 μm to 190 μm, and the average thickness may be the same as the average thickness of the center regions 121 and 221. An aspect of the disclosure, by adjusting the average thickness of the negative electrode active layers 120 and 220 to the above range, the orientation tendency of the carbon-based negative electrode active material contained in each region can be easily controlled according to the thickness change tendency, thereby improving the high-rate charge and discharge characteristics and energy density of the battery including the negative electrodes 100 and 200.

In addition, the negative electrode active layers 120 and 220 may have a structure in which two separate layers are stacked, depending on the battery model or product application to which the negative electrode according to an aspect of the disclosure is applied, but is not limited thereto. In this case, the negative electrode according to an aspect of the disclosure may have a structure in which a first negative active layer (not shown) is arranged on the current collectors 110 and 210, and a second negative active layer (not shown) is arranged on the first negative active layer. In this case, the first negative electrode active layer and the second negative electrode active layer contain a carbon-based negative electrode active material (C-A), but the carbon-based negative electrode active material (C-A) contained in each layer may be the same or different.

Furthermore, the negative electrode active layers 120 and 220 include a carbon-based negative electrode active material (C-A) as a negative electrode active material to realize electrical activity through a reversible redox reaction during charging and discharging of the battery.

The carbon-based negative electrode active material (C-A) refers to a material having carbon atoms as a main component, and such a carbon-based negative electrode active material (C-A) may include graphite. The graphite may include one or more of natural graphite, artificial graphite, but preferably includes natural graphite, or may include a mixture of natural graphite and artificial graphite.

Preferably, the carbon-based negative electrode active material (C-A) is a spherical graphite assembly formed by aggregation of a plurality of scale like graphite. The scale like graphite includes natural graphite, artificial graphite, mesophase calcined carbon (bulk mesophase) based on tar and pitch, graphitized coke (raw coke, green coke, pitch coke, needle coke, petroleum coke, etc.), and the like, and is preferably assembled using a plurality of highly crystalline natural graphite. Further, one graphite assembly may be formed by assembling from 2 to 100, preferably from 3 to 20, pieces of scale like-shaped graphite.

Further, the carbon-based negative electrode active material (C-A) may present an average particle diameter (D50) of 0.5 μm to 20 μm, and more specifically, may present an average particle diameter (D50) of 0.5 μm to 15 μm; 0.5 μm to 10 μm; 5 μm to 20 μm; 10 μm to 20 μm; 12 μm to 18 μm; 2 μm to 7 μm; 0.5 μm to 5 μm; or 1 μm to 3 μm.

The average particle diameter of natural graphite can be advantageous to have a smaller particle diameter to maximize the disorder in the direction of expansion for each particle to prevent the particles from swelling due to the charging of the lithium ions. However, when the particle diameter of natural graphite is less than 0.5 μm, a large amount of binder may be needed due to the increase in the number of particles per unit volume. On the other hand, when the maximum particle diameter exceeds 20 μm, the expansion becomes severe, and the binding property between particles and the binding property of particles to the current collector may decrease as the charge and discharge are repeated, and the cycling characteristics may be greatly reduced.

In addition, the negative electrode active layer according to an aspect of the disclosure may optionally further include conductive materials, binders, other additives, etc., as needed, along with the carbon-based negative electrode active material (C-A) as the main component.

The conductive material may include, but is not limited to, one or more of carbon black, acetylene black, ketene black, carbon nanotubes, carbon fibers, and the like.

As one example, the negative electrode active layer may contain carbon black, carbon nanotubes, carbon fibers, and the like as a conductive material alone or in combination.

In this case, the content of the conductive material may be 0.1 to 10 parts by weight over the total 100 parts by weight of the negative electrode active layer, and more specifically, it may be 0.1 to 8 parts by weight, 0.1 to 5 parts by weight, 0.1 to 3 parts by weight, 2 to 6 parts by weight, or 0.5 to 2 parts by weight. An aspect of the disclosure, by controlling the content of the conductive material to the range as described above, can prevent a problem in which the resistance of the negative electrode increases due to a low content of the conductive material, resulting in a decrease in the charging capacity, and a problem in which the content of the negative electrode active material decreases due to an excess of the conductive material, resulting in a decrease in the charging capacity, or a problem in which the rapid charging characteristic decreases due to an increase in the loading amount of the negative electrode active layer.

Further, the binder may be suitably applied as a component that assists in the coupling of the negative electrode active material and the conductive material and the like to the current collector, to the extent that it does not degrade the electrical properties of the electrode, Specifically, vinylidene fluoride-hexafluoropropylene copolymer (PVDF-co-HFP), polyvinylidenefluoride (PVdF), polyacrylonitrile, and polymethylmethacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, ethylene-propylene-diene monomer, sulfonated ethylene-propylene-diene monomer, styrene butadiene rubber (SBR), and fluorinated rubber, including one or more selected from the group consisting thereof.

The content of the binder may be from 0.1 to 10 parts by weight, more specifically from 0.1 to 8 parts by weight, from 0.1 to 5 parts by weight, from 0.1 to 3 parts by weight, or from 2 to 6 parts by weight, based on a total of 100 parts by weight of the negative electrode active layer. An aspect of the disclosure can control the content of the binder contained in the negative electrode active layer to the above range, thereby preventing the adhesion of the active layer from deteriorating due to a low content of the binder or the electrical properties of the electrode from decreasing due to an excess of the binder.

In addition, the negative electrode current collector is not particularly limited as long as it has a high conductivity without causing chemical changes in the battery, and for example, copper, stainless steel, nickel, titanium, calcined carbon, and the like can be used, and in the case of copper or stainless steel, a surface treated with carbon, nickel, titanium, silver, and the like can also be used. In addition, the average thickness of the negative electrode of the current collector may be suitably applied from 1 to 500 μm, taking into account the conductivity and total thickness of the negative electrode manufactured.

Lithium Secondary Battery

An aspect of the disclosure provides a lithium secondary battery comprising an electrode assembly including a positive electrode, a negative electrode as described above, and a separator disposed between the positive and negative electrodes.

A lithium secondary battery according to an aspect of the disclosure includes an electrode assembly having a plurality of positive electrodes, separators and negative electrodes each arranged in sequence; and an electrolyte composition having lithium salts and electrolyte additives dissolved in a non-aqueous organic solvent. Wherein, the lithium secondary battery includes a negative electrode having a structure in which a negative electrode active layer is stacked on the current collector, the negative electrode active layer divided into a center region, an edge region, and a sliding region, wherein the alignment degree (O.I.) of each carbon-based negative electrode active material contained in the center region, the edge region, and the sliding region satisfies Formula 1 and Formula 2. Accordingly, the lithium secondary battery has the advantage of having a small volume change of the negative electrode during charging and discharging, thus exhibiting an excellent battery lifespan, a high-rate charge and discharge characteristic and a high energy density.

In this case, the negative electrode has the same configuration as the above-described configuration, and therefore, specific description is omitted.

Further, the positive electrode includes a positive electrode active material layer prepared by applying, drying, and pressing a slurry including a positive electrode active material on the current collector, which may optionally further include conductive materials, binders, other additives, and the like as needed.

The positive electrode active material is a material capable of electrochemically reacting on the positive electrode current collector, and may include one or more of the lithium metal oxides represented by Chemical formula 1 and Chemical formula 2 below, which are capable of reversibly intercalating and deintercalation lithium ions:

$Li_x[Ni_yCo_2Mn_wM^1_v]O_2$ [Chemical formula 1]

$LiM^2_pMn_qP_rO_4$ [Chemical formula 2]

In Chemical formula 1 and Chemical formula 2 above, $M^1$ is at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
x, y, z, w, and v are $1.0 \le x \le 1.30$, $0.5 \le y < 1$, $0 < z \le 0.3$, $0 < w \le 0.3$, and $0 \le v \le 0.1$, respectively, wherein $y+z+w+v=1$,
$M^2$ is Ni, Co, or Fe; and
p is $0.05 \le p \le 1.0$, and
q is 1-p or 2-p, and
r is 0 or 1.

Lithium metal oxides, represented by Chemical formula 1 and Chemical formula 2 above, are materials containing a high content of nickel (Ni) and manganese (Mn), respectively, and when used as positive electrode active materials, have the advantage of being able to stably supply electricity of high capacity and/or high voltage compared to conventionally used positive electrode active materials such as lithium iron phosphate (LiFeO4), etc.

In this case, lithium metal oxides represented by Chemical formula 1 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, etc., and lithium metal oxides represented by Chemical formula 2 may include $LiNi_{0.7}Mn_{1.3}O_4$; $LiNi_{0.5}Mn_{1.5}O_4$; $LiNi_{0.3}Mn_{1.7}O_4$, $LiFePO_4$, $LiFe_qMn_{1-q}PO_4$, etc., and these can be used alone or in combination.

Further, the positive electrode active material may be more than 85 parts by weight of the positive electrode active material layer, and more specifically, it may be more than 90 parts by weight, more than 93 parts by weight, or more than 95 parts by weight.

In addition, the positive electrode active material layer may further include conductive materials, binders, other additives, and the like along with the positive electrode active material.

In this case, the conductive material may be used to improve the electrical performance of the positive electrode, and may apply those conventionally used in the art, but may specifically include at least one type selected from the group consisting of natural graphite, artificial graphite, carbon black, acetylene black, denka black, ketchen black, super-P, channel black, furnace black, lamp black, summer black, graphene, and carbon nanotubes.

Moreover, the conductive material may include 0.1 to 5 parts by weight of each positive electrode active layer, more specifically, 0.1 to 4 parts by weight; 2 to 4 parts by weight; 1.5 to 5 parts by weight; 1 to 3 parts by weight; 0.1 to 2 parts by weight; or 0.1 to 1 part by weight.

Further, the binder serves to cause the positive electrode active material, the positive electrode additive, and the conductive material to be bonded to each other, and may be used without limitation as long as it has this function. Specifically, the binder may include one or more resins selected from the group consisting of polyvinylidenefluoride-hexafluoropropylene copolymer (PVdF-co-HFP), polyvinylidenefluoride (PVdF), polyacrylonitrile, polymethylmethacrylate, and copolymers thereof. In one example, the binder may include polyvinylidenefluoride.

In addition, the binder may be from 1 to 10 parts by weight of each positive electrode active layer, more particularly from 2 to 8 parts by weight; or from 1 to 5 parts by weight.

The total thickness of the positive electrode active layer is not particularly limited, but may be from 50 μm to 300 μm, more specifically from 100 μm to 200 μm; from 80 μm to 150 μm; from 120 μm to 170 μm; from 150 μm to 300 μm; from 200 μm to 300 μm; or from 150 μm to 190 μm.

Further, as the positive electrode, a positive current collector having a high conductivity without causing chemical changes in the battery can be used. For example, stainless steel, aluminum, nickel, titanium, calcined carbon, and the like can be used, and in the case of aluminum or stainless steel, a surface treatment of carbon, nickel, titanium, silver, and the like can also be used. In addition, the average thickness of the above current collector may be suitably applied from 3 to 500 μm in consideration of the conductivity and total thickness of the positive electrode to be manufactured.

Meanwhile, the separator interposed between the positive electrode and the negative electrode of each unit cell is an insulating thin film having high ion permeability and mechanical strength, and is not particularly limited to those conventionally used in the art, but in particular, it is possible to use a polymer including one or more of polypropylene; polyethylene; and polyethylene-propylene copolymers having chemical resistance and hydrophobicity. The separator may have the form of a porous polymeric substrate such as a sheet or nonwoven fabric including the above-described polymer, and in some cases, it may also have the form of a composite separator in which organic or inorganic particles are coated by an organic binder on the porous polymeric substrate. Further, the separator may have an average diameter of the pores of 0.01 to 10 μm, and an average thickness of 5 to 300 μm.

Meanwhile, a lithium secondary battery according to an aspect of the disclosure may be a secondary battery of any shape, including, but not limited to, a stacked type; zigzag type; or zigzag-stacked type electrode assembly. As one example, the lithium secondary battery according to an aspect of the disclosure may be a pouch-type secondary battery or a prismatic secondary battery.

Manufacturing Method of Negative Electrode

An aspect of the disclosure further comprises, applying a negative electrode slurry including a carbon-based negative electrode active material onto a negative current collector;

applying a magnetic field to the applied negative electrode slurry; and including drying the magnetic field applied negative electrode slurry to form a negative electrode active layer, wherein the negative active layer is divided into a center region including a central portion in a width direction of the negative active layer, a sliding region located at an edge of the negative active layer and having a thickness gradient, and an edge region located between the center region and the sliding region; and providing a method for manufacturing a negative electrode for a lithium secondary battery satisfying Formula 1 and Formula 2 below:

$$1.6 \leq [O.I_{edge}]/[O.I_{center}] \leq 2.5 \quad \text{[Formula 1]}$$

$$2.6 \leq [O.I_{sliding}]/[O.I_{center}] \leq 3.5 \quad \text{[Formula 2]}$$

(In Formula 1 and Formula 2, $O.I_{edge}$ indicates the degree of alignment (O.I.) in the edge region, $O.I_{center}$ indicates the degree of alignment (O.I.) at the center region, and $O.I_{sliding}$ indicates the alignment in the sliding region, The degree of alignment (O.I.) indicates the ratio ($I_{004}/I_{110}$) of the area ($I_{004}$) of the peak representing the [0,0,4] crystal plane and the area ($I_{110}$) of the peak representing the [1,1,0] crystal plane in the XRD measurement for the negative electrode active layer).

A method for manufacturing a negative electrode according to an aspect of the disclosure may include applying a negative electrode slurry including a carbon-based negative electrode active material on a current collector, and by applying a magnetic field to a surface of the applied negative electrode slurry, the carbon-based negative electrode active material in the negative electrode slurry may be aligned to have a predetermined angle with respect to a surface of the current collector. Subsequently, the negative electrode may be manufactured by drying the negative electrode slurry in which the alignment degree of the carbon-based negative electrode active material is reduced to form a negative electrode active layer.

Here, applying the negative electrode slurry is coating the surface of the moving current collector by discharging the negative electrode slurry containing the carbon-based negative electrode active material, and may be applied in any manner conventionally applied in the art without being particularly limited, but preferably may utilize a die coating method. The die coating method may be performed by means of a slot die having a shim for controlling the discharge conditions of the negative electrode slurry. In this case, by controlling the shape or the like of the shim, the loading amount, the application thickness, etc. of the negative electrode slurry applied on the current collector can be easily controlled.

Further, the applying a magnetic field to the negative electrode slurry may be orienting the crystal planes of the carbon-based negative electrode active material contained in the negative electrode slurry to have a predetermined angle with respect to the current collector. For this, the applying a magnetic field may be applied by magnet portions disposed on the upper portion and the lower portion of the negative current collector, which is moved by applying the negative slurry on its surface.

In this case, the degree of alignment (O.I.) of the carbon-based negative electrode active material contained in the negative electrode slurry may be adjusted by an applied magnetic field strength or a time of exposure to the magnetic field, and accordingly, the applying the magnetic field may be performed under a predetermined magnetic field strength and time condition.

Specifically, the applying the magnetic field may be applied with a magnetic field of 2,000 G (Gauss) to 6,000 G (Gauss), and more specifically, the magnetic field may be applied with a strength of 2,500 G to 5,500 G; 3,000 G to 5,500 G; 3,500 G to 5,500 G; 4,000 G to 5,500 G; 3,500 G to 4,500 G; or 4,500 G to 5,000 G.

Further, the applying the magnetic field may be performed for a period of from 5 seconds to 60 seconds, more specifically, from 10 seconds to 60 seconds; from 10 seconds to 30 seconds; from 30 seconds to 60 seconds; from 40 seconds to 50 seconds; from 15 seconds to 35 seconds; or from 10 seconds to 50 seconds.

In one example, the applying the magnetic field may include applying a magnetic field of 4,700±100 G to the negative electrode slurry for 12 seconds to 33 seconds.

Further, the applying the magnetic field may be performed by magnet portions introduced into the upper portion and the lower portion of the applied negative slurry, as mentioned above, but the size of the magnet portions may be adjusted to be larger than the size of the negative slurry along the width direction so that the magnetic field applied to the negative slurry may be uniformly applied to the entire surface of the negative slurry. For example, the magnet portion may have a length ratio of 105% to 200% based on a width to length ratio of the negative electrode slurry, and more specifically, may have a length ratio of 110% to 180%; 110% to 160%; 110% to 140%; 110% to 130%; 130% to 150%; or 105% to 120% based on a width to length ratio of the negative electrode slurry.

An aspect of the disclosure may control the regional orientation of the carbon-based negative electrode active material contained in the negative electrode slurry to satisfy Formula 1 and Formula 2 by controlling the magnetic field strength, the application time, and/or the magnet portion size as described above in the step of applying the magnetic field.

Further, the forming the negative electrode active layer may include: drying the negative electrode slurry; and rolling the dried negative electrode slurry.

In this case, drying the negative electrode slurry may be applied in any manner that can maintain the orientation of the carbon-based negative electrode active material contained within the negative electrode active layer, without being particularly limited.

For example, the drying may be performed by applying thermal energy to the negative electrode slurry using a hot air dryer, a vacuum oven, or the like to dry the negative electrode slurry.

Further, the rolling the dried negative electrode slurry increases the density of the negative electrode active layer by applying pressure to the dried negative electrode slurry using a roll press or the like. At this time, the rolling may be performed at a temperature condition higher than room temperature.

Specifically, the rolling may be performed at a temperature of 50° C. to 100° C., more specifically, at a temperature of 60° C. to 100° C.; 75° C. to 100° C.; 85° C. to 100° C.; 50° C. to 90° C.; 60° C. to 80° C.; or 65° C. to 90° C. More specifically, the rolling may be performed at a rolling speed of 2 m/s to 7 m/s, and more specifically, the rolling may be performed at a rolling speed of 2 m/s to 6.5 m/s; 2 m/s to 6 m/s; 2 m/s to 5.5 m/s; 2 m/s to 5 m/s; 2 m/s to 4.5 m/s; 2 m/s to 4 m/s; 2.5 m/s to 4 m/s; 2.5 m/s to 3.5 m/s; 3.5 m/s to 5 m/s; 5 m/s to 7 m/s; 5.5 m/s to 6.5 m/s; or 6 m/s to 7 m/s. Further, the rolling may be performed under a pressure condition of 50 MPa to 200 MPa, more particularly, under a pressure condition of 50 MPa to 150 MPa; 50 MPa to 100 MPa; 100 MPa to 200 MPa; 150 MPa to 200 MPa; or 80 MPa to 140 MPa.

An aspect of the disclosure enables the rolling of the dried negative electrode slurry to be performed under the above temperature, speed and/or pressure conditions, thereby increasing the energy density of the negative electrode while minimizing the change in the degree of alignment of the carbon-based negative electrode active material contained in the formed negative electrode active layer.

Further, the average thickness of the edge region may be equal to or narrower than the average thickness of the center region before rolling, and accordingly, the amount of negative electrode slurry loading in the edge region may be equal to or smaller than the amount of negative electrode slurry loading in the center region. Specifically, the edge region of the negative electrode active layer may have a thickness ratio of more than 90% and less than 105% based on an average thickness of the center region of the negative electrode active layer before rolling. More specifically, the edge region may be 95% to 100%; 98% to 102%; or 97% to 100% based on the average thickness of the center region before rolling.

MODE FOR INVENTION

Hereinafter, an aspect of the disclosure will be described in more detail by way of examples and experimental examples.

However, the following Examples and Experimental Examples are only illustrative of an aspect of the disclosure, and the disclosure is not limited to the following Examples and Experimental Examples.

Examples 1 to 3 and Comparative Examples 1 to 3.
Preparation of a Negative Electrode for a Lithium Secondary Battery A negative electrode for a lithium secondary battery was prepared by reflecting the conditions shown in Table 1 below.

First, natural graphite (average particle diameter: 10±1 μm) and artificial graphite (average particle diameter: 8±1 μm) were prepared as carbon-based negative electrode active materials, respectively, and a negative electrode slurry was prepared using the prepared carbon-based negative electrode active materials.

Specifically, a negative electrode active material was prepared by mixing natural graphite and artificial graphite in a weight ratio of 1 to 3:7 to 9, and carbon black as a conductive material and carboxymethylcellulose (CMC) and styrene butadiene rubber (SBR) as binders. Then, a negative electrode slurry was prepared by mixing 95 parts by weight of mixed graphite, 1 part by weight of carbon black, 1.5 parts by weight of carboxymethylcellulose (CMC) and 2.5 parts by weight of styrene butadiene rubber (SBR) with water to make 50% solids.

Once the negative electrode slurry was prepared, the negative electrode slurry was cast using a die coater on a copper thin plate (thickness: 10 μm) under roll-to-roll transfer (transfer speed: 5 m/min). At this time, the negative electrode slurry was cast so that the average thickness was 190 μm along the transfer direction of the copper thin plate, and by varying the shape of the shim provided in the die coater, the average thickness of each area of the negative electrode active layer after rolling was controlled as shown in Table 1.

Then, permanent magnets having a length ratio of 110 to 120% based on the length in the width direction of the applied negative slurry were placed in the upper portion of the applied negative slurry and the lower portion of the current collector, and a magnetic field of 4,700±100 G was applied for 15 seconds, and the negative slurry with the applied magnetic field was hot-dried to form a negative electrode active layer. The formed negative electrode active layer was rolled at 50±1° C. at a pressure of 100 to 150 MPa and a transfer speed of 3 m/s to prepare a negative electrode for a lithium secondary battery having a cross-sectional structure as shown in FIG. 1.

For the negative electrode active layer of each manufactured negative electrode, a region having a length ratio of 98.5% based on the length in the width direction of the negative electrode active layer in the center was set as the center region, and regions (each having a length ratio of 0.5%) disposed on both sides of the center region at a total length ratio of 1.0% were set as edge regions. Then, the regions with a length ratio of 0.5% (each with a length ratio of 0.25%) on the outer side of the edge region were set as sliding regions.

Then, the average thickness of each set area was measured, and the results are shown in Table 1 below. In this case, the average thickness of the center region and the edge region of the negative electrode active layer was obtained by measuring the confocal thickness for each region three times and calculating the average value thereof; and the sliding region of the negative electrode active layer was defined as the average thickness of the point where the length of the sliding region is ½ of the length of the negative electrode active layer in the width direction.

In addition, X-ray diffraction spectroscopy (XRD) was performed on each region of the negative electrode active layer to measure the spectrum. The measurement conditions for X-ray diffraction (XRD) were as follows:
Target: Cu (Kα line) graphite monochromator
Slit: Divergence slit=1 degree, Reception slit=0.1 mm, Scattering slit=1 degree
Measurement area: [1,1,0] plane: 76.5 degrees<2θ<78.5 degrees/[0,0,4] plane: 53.5 degrees<2θ<56.0 degrees.

From the spectrum measured under the above conditions, the respective areas of the peak representing the [0,0,4] crystal plane and the peak representing the [1,1,0] crystal plane were calculated, and the ratio of these areas ($I_{004}/I_{110}$) was calculated to obtain the ordering index (O.I.) of the mixed graphite by region. The calculated values are shown in Table 1 below.

TABLE 1

| | | Example 1 | Example 2 | Example 3 | Comparative Example 1 | Comparative Example 2 | Comparative Example 3 |
|---|---|---|---|---|---|---|---|
| Center region | Average thickness [μm] | 148 | 145 | 136 | 145 | 145 | 145 |
| | $O.I_{center}$ | 0.95 | 0.90 | 1.32 | 0.90 | 0.90 | 0.91 |
| Edge region | Average thickness [μm] | 146 | 143 | 132 | 147 | 134 | 142 |
| | $O.I_{edge}$ | 1.87 | 2.04 | 2.35 | 1.22 | 2.96 | 1.99 |
| Sliding region | Average thickness [μm] | 75 | 763 | 64 | 80 | 59 | 55 |
| | $O.I_{sliding}$ | 2.52 | 2.96 | 3.68 | 2.31 | 4.11 | 5.25 |
| [$O.I_{edge}$]/[$O.I_{center}$] | | 1.97 | 2.27 | 1.78 | 1.36 | 3.29 | 2.19 |
| [$O.I_{sliding}$]/[$O.I_{center}$] | | 2.65 | 3.29 | 2.79 | 2.57 | 4.57 | 5.77 |

Comparative Examples 4 and 5. Preparation of Negative Electrode for Lithium Secondary Battery A negative electrode for a lithium secondary battery was prepared by the same method as in Example 2, except that a magnetic field was not applied after casting of the negative electrode slurry, or a magnetic field was applied using a permanent magnet having a length ratio of 95 to 100% based on the length in the width direction of the negative electrode slurry.

The manufactured negative electrodes were measured by the same method as in Example 2 for the average thickness of each region of the negative electrode active layer and the degree of alignment (O.I.) of the carbon-based negative electrode active material, and the measured results were as shown in Table 2 below. Where "o" means applied and "X" means not applied.

TABLE 2

| | | Comparative Example 4 | Comparative Example 5 |
|---|---|---|---|
| Magnetic field applied or not | | O | X |
| Center region | Average thickness [μm] | 145 | 145 |
| | $O.I_{center}$ | 0.9 | 5.41 |
| Edge region | Average thickness [μm] | 144 | 145 |
| | $O.I_{edge}$ | 1.05 | 5.33 |
| Sliding region | Average thickness [μm] | 79 | 80 |
| | $O.I_{sliding}$ | 1.32 | 4.18 |
| [$O.I_{edge}$]/[$O.I_{center}$] | | 1.17 | 0.99 |
| [$O.I_{sliding}$]/[$O.I_{center}$] | | 1.47 | 0.77 |

Examples 4 to 6 and Comparative Examples 6 to 10. Manufacturing of Lithium Secondary Battery A positive electrode was prepared by preparing LiNi0.7Co0.1Mn0.1Al0.1O2 having a particle size of 5 μm as a positive electrode active material, mixing it in N-methyl pyrrolidone (NMP) in a weight ratio of 94:3:3 with polyvinylidene fluoride as a carbon-based conductive agent and binder to form a slurry, casting it on an aluminum thin plate, drying it in a vacuum oven at 120° C., and rolling it.

A separator comprising 18 μm of polypropylene was interposed between the above-obtained positive electrode and the negative electrode prepared in Examples 1-3 and Comparative Examples 1-3 and 5, respectively, and the lithium secondary battery was assembled by inserting it into a case and then injecting an electrolyte composition.

At this time, the types of negative electrodes applied to each lithium secondary battery are indicated in Table 3 below.

TABLE 3

| | Type of applied negative electrode |
|---|---|
| Example 4 | Negative electrode prepared in Example 1 |
| Example 5 | Negative electrode prepared in Example 2 |
| Example 6 | Negative electrode prepared in Example 3 |
| Comparative Example 6 | Negative electrode prepared in Comparative Example 1 |
| Comparative Example 7 | Negative electrode prepared in Comparative Example 2 |
| Comparative Example 8 | Negative electrode prepared in Comparative Example 3 |
| Comparative Example 9 | Negative electrode prepared in Comparative Example 4 |
| Comparative Example 10 | Negative electrode prepared in Comparative Example 5 |

Experimental Example

The following experiments were performed to evaluate the performance of the negative electrode according to an aspect of the disclosure.

a) Evaluation of Thickness Expansion Characteristics of Negative Electrode

The lithium secondary batteries prepared in Examples 4-6 and Comparative Examples 6-10 were performed 30 times of charge and discharge at a rate of 0.5 C, and then recharged to disassemble the batteries in a fully charged (SOC 100%) state. After collecting the negative electrode from the disassembled batteries, it was washed with diethyl carbonate (DEC) and dried to analyze the thickness expansion rate of the negative electrode after charge and discharge. The results are shown in Table 4.

b) Evaluation of High Rate Charging Performance

The lithium secondary batteries prepared in Examples 4-6 and Comparative Examples 6-10 were charged to a point of 80% SOC by applying a current of 3.0 C-rate, and the voltage change and dV/dQ according to SOC were measured. Lithium was identified as precipitated from the negative electrode surface if a voltage plateau was present in the measured voltage change, or if the graph plotting dV/dQ was bimodal. In addition, the corresponding SOC value at which lithium was identified as precipitated was defined as the maximum SOC value at which the secondary battery could be rapidly charged, and it was measured. The results are shown in Table 4 below.

C) Evaluation of High-Rate Discharge Performance

For the lithium secondary batteries prepared in Examples 4-6 and Comparative Examples 6-10, the capacity was measured when the lithium secondary batteries were buffered to 0.5 C-rate (SOC 100%) and the buffered lithium secondary batteries were discharged to 1.5 V at 0.1 C-rate. Then, each lithium secondary battery was buffered again at 0.5 C-rate (SOC 100%) and discharged at 2.0 C-rate to 1.5 V. The charge and discharge process were repeated 100 times, and the capacity at 0.1 C-rate discharge was calculated based on the capacity at 2.0 C-rate, and the capacity retention rate after 100 discharges was calculated, and the results are shown in Table 4 below. The percentage of the calculated initial charge capacity is marked with "○" if it is more than 85%, "X" if the percentage of the initial charge capacity is 80% or less, and "Δ" if the percentage of the initial charge capacity is more than 80% but less than 85%.

TABLE 4

|  | Thickness expansion rate [%] | High-rate output characteristics performance | |
|---|---|---|---|
|  |  | High rate charging 3 C [%] | High rate discharging 2 C [%] |
| Example 4 | 21 | 42 | ○ |
| Example 5 | 20 | 46 | ○ |
| Example 6 | 23 | 40 | ○ |
| Comparative Example 6 | 32 | 36 | Δ |
| Comparative Example 7 | 29 | 38 | Δ |
| Comparative Example 8 | 36 | 34 | Δ |
| Comparative Example 9 | 38 | 34 | X |
| Comparative Example 10 | 43 | 31 | X |

As shown in Table 4 above, it can be seen that the negative electrode for the lithium secondary battery according to an aspect of the disclosure has less thickness expansion of the negative electrode during charge and discharge and has excellent output performance.

Specifically, it is found that the lithium secondary batteries manufactured in the examples have a low thickness expansion rate of the negative electrode after charge and discharge of 25% or less, and when charging at a high rate of 3.0 C-rate, lithium plating occurs later than the secondary batteries manufactured in the comparative examples, and the SOC at which lithium is precipitated is higher than 40%. Furthermore, it was found that the above lithium secondary batteries have a capacity retention rate of more than 85% when discharged 100 times at a high rate of 2.0 C-rate.

This means that the negative electrodes of the example have a configuration in which the order of alignment (O.I.) of each carbon-based negative electrode active material contained in the center region, edge region, and sliding region of the negative electrode active layer satisfies Equation 1 and Equation 2, thereby further reducing the volume change of the negative electrode during charging and discharging of the secondary battery, and further improving the accessibility of the lithium ions in the negative electrode active layer, thereby improving the high-rate characteristics.

From these results, it can be seen that the negative electrode for the lithium secondary battery according to an aspect of the disclosure exhibits a small volume change during charge and discharge, excellent high-rate charge and discharge performance, and high energy density.

As above, the present invention has been described in more detail through the examples. However, since the configuration described in the embodiments described herein is merely one embodiment of the present invention and do not represent the overall technical spirit of the invention, it should be understood that the invention covers various equivalents, modifications, and substitutions at the time of filing of this application.

Thus, the technical scope of the present invention is not limited to what is described in the detailed description of the specification but should be determined by the claims of the patent.

DESCRIPTION OF REFERENCE NUMERALS 100 and 200: negative electrode for lithium secondary battery
110 and 210: negative electrode current collector
120 and 220: negative electrode active layer
121 and 221: center region of negative electrode active layer
122 and 222: edge region of negative electrode active layer
123 and 223: sliding region of negative electrode active layer
C-A: carbon-based negative electrode active material
↑: alignment direction of crystal plane of carbon-based negative electrode active material

The invention claimed is:

1. A negative electrode for a lithium secondary battery comprising:
a negative electrode current collector; and
a negative electrode active layer provided on at least one side of the negative electrode current collector and comprising a carbon-based negative electrode active material,
wherein the negative electrode active layer includes a center region, a sliding region, and an edge region along a width direction of the negative electrode active layer,
wherein the center region includes a center portion,
wherein the sliding region is located at an edge of the negative electrode active layer and has a thickness gradient,
wherein the edge region is located between the center region and the sliding region;
wherein a length of the center region is in a range of 90% or more of a total length in the width direction of the negative electrode active layer, and
wherein a length of the sliding region is in a range of 3% or less of the total length in the width direction of the negative electrode active layer, and the edge region has a ratio excluding the ratio of the center region and the sliding region among the total length in the width direction of the negative electrode active layer,
wherein the loading amount per unit area of carbon-based negative electrode active material contained in the negative electrode active layer decreases in the following order: center region, edge region and sliding region,
wherein the alignment degree (O.I$_{center}$) in the center region is in a range of 0.7 to 1.5, and satisfies Formula 1 and Formula 2:

$$1.6 \leq [O.I_{edge}]/[O.I_{center}] \leq 2.5 \quad \text{[Formula 1]}$$

$$2.6 \leq [O.I_{sliding}]/[O.I_{center}] \leq 3.5 \quad \text{[Formula 2]}$$

wherein O.I$_{edge}$ indicates a degree of alignment (O.I.) in the edge region,
wherein O.I$_{center}$ indicates a degree of alignment (O.I.) in the center region, and
O.I$_{sliding}$ indicates a degree of alignment (O.I.) in the sliding region, and
wherein each of the degrees of alignment (O.I.) indicates a ratio ($I_{004}/I_{110}$) of an area ($I_{004}$) of a peak representing a [0,0,4] crystal plane and an area ($I_{110}$) of a peak representing a [1,1,0] crystal plane in an XRD measurement for the negative electrode active layer.

2. The negative electrode of claim 1, wherein the negative electrode active layer satisfies Formula 3:

$$R_{sliding} < R_{edge} \leq R_{center} \quad \text{[Formula 3]}$$

wherein R$_{sliding}$ indicates an average thickness of the sliding region,
wherein R$_{edge}$ indicates an average thickness of the edge region, and
wherein R$_{center}$ indicates an average thickness of the center region.

3. The negative electrode of claim 1, wherein an average thickness of the center region is in a range of 100 μm to 300 μm.

4. The negative electrode for a lithium secondary battery of claim 1, wherein the carbon-based negative electrode active material comprises one or more of a natural graphite or an artificial graphite.

5. A method for manufacturing a negative electrode for a lithium secondary battery of claim 1 comprising:
applying a negative electrode slurry comprising a carbon-based negative electrode active material onto a negative current collector;
applying a magnetic field to the negative electrode slurry; and
drying the negative electrode slurry to form a negative electrode active layer,
wherein the negative electrode active layer includes a center region, a sliding region, and an edge region along a width direction of the negative electrode active layer,
wherein the center region includes a central portion,
wherein the sliding region is located at an edge of the negative electrode active layer and has a thickness gradient, and
wherein the edge region is located between the center region and the sliding region;
wherein the negative electrode satisfies Formula 1 and Formula 2:

$$1.6 \leq [O.I_{edge}]/[O.I_{center}] \leq 2.5 \quad \text{[Formula 1]}$$

$$2.6 \leq [O.I_{sliding}]/[O.I_{center}] \leq 3.5 \quad \text{[Formula 2]}$$

wherein O.I$_{edge}$ indicates a degree of alignment (O.I) in the edge region,
wherein O.I$_{center}$ indicates a degree of alignment (O.I) in the center region, and
wherein O.I$_{sliding}$ indicates a degree of alignment (O.I.) in the sliding region,
wherein each of the degrees of alignment (O.I) indicates a ratio ($I_{004}/I_{110}$) of an area ($I_{004}$) of a peak representing a [0,0,4] crystal plane and an area ($I_{110}$) of a peak representing a [1,1,0] crystal plane in an XRD measurement for the negative electrode active layer.

6. The method for manufacturing of claim 5, wherein in the applying the magnetic field in a range of 2,000 G to 6,000 G is applied.

7. The method for manufacturing of claim 5, wherein a time for applying the magnetic field is in a range of 5 seconds to 60 seconds.

8. The method for manufacturing of claim 5, wherein in the applying the magnetic field, a plurality of magnet portions are disposed adjacent an upper portion and a lower portion of the negative electrode slurry, and
wherein the plurality of magnet portions have a length in a range of 105% to 200% based on a length in the width direction of the negative electrode slurry.

9. The method for manufacturing of claim 5, further comprises rolling the negative electrode slurry after the drying.

10. The method for manufacturing of claim 9, wherein an average thickness of the edge region is in a range of 90% to 105% based on an average thickness of the center region of the negative electrode active layer before rolling.

* * * * *